US011300293B2

(12) United States Patent
Tentorio et al.

(10) Patent No.: US 11,300,293 B2
(45) Date of Patent: Apr. 12, 2022

(54) GAS TURBINE FUEL INJECTOR COMPRISING A SPLITTER HAVING A CAVITY

(71) Applicant: ROLLS-ROYCE plc, London (GB)

(72) Inventors: Luca Tentorio, Derby (GB); Juan Carlos Roman Casado, Derby (GB); Giacomo Di Chiaro, Derby (GB); Jonathan Knapton, Derby (GB); Filippo Zambon, Derby (GB); Radu Irimia, Derby (GB)

(73) Assignee: ROLLS-ROYCE plc, London (GB)

( * ) Notice: Subject to any disclaimer, the term of this patent is extended or adjusted under 35 U.S.C. 154(b) by 0 days.

(21) Appl. No.: 16/903,456

(22) Filed: Jun. 17, 2020

(65) Prior Publication Data
US 2020/0408407 A1  Dec. 31, 2020

(30) Foreign Application Priority Data
Jun. 26, 2019  (GB) ...................................... 1909168

(51) Int. Cl.
*F23R 3/28*  (2006.01)
*F23R 3/14*  (2006.01)
*F23R 3/34*  (2006.01)

(52) U.S. Cl.
CPC ................ *F23R 3/14* (2013.01); *F23R 3/286* (2013.01); *F23R 3/343* (2013.01)

(58) Field of Classification Search
CPC .................................... F23R 3/286; F23R 3/14
See application file for complete search history.

(56) References Cited

U.S. PATENT DOCUMENTS

| 8,387,391 | B2 * | 3/2013 | Patel | ......................... F23R 3/28 |
| | | | | 60/740 |
| 9,915,429 | B2 * | 3/2018 | Toon | ......................... F23R 3/28 |

(Continued)

FOREIGN PATENT DOCUMENTS

| EP | 1186832 A2 | 3/2002 |
| EP | 1719950 A2 | 11/2006 |

(Continued)

OTHER PUBLICATIONS

Oct. 26, 2020 Extended European Search Report issued in European Patent Application No. 20181824.2.

(Continued)

Primary Examiner — William H Rodriguez
(74) Attorney, Agent, or Firm — Oliff PLC

(57) ABSTRACT

A fuel injector comprising a first air swirler passage and a second air swirler passage extending axially through the fuel injector and arranged to direct air through the fuel injector, a splitter arranged between the first air swirler passage and the second air swirler passage and comprising a first splitter surface having a first divergent portion which is divergent in the downstream direction, a second splitter surface located radially inward of the first splitter surface and having a second divergent portion which is divergent in the downstream direction, a third splitter surface located radially inward of the first and second splitter surface, and a first connecting surface extending between the second and third splitter surfaces, wherein a first cavity is formed between the first and second splitter surfaces, and the second divergent portion comprises at least one opening in fluid communication with the first cavity.

16 Claims, 7 Drawing Sheets

(56) References Cited

U.S. PATENT DOCUMENTS

| | | | |
|---|---|---|---|
| 10,041,498 B2* | 8/2018 | Otto | F04D 25/028 |
| 10,066,548 B2* | 9/2018 | Gilson | F02K 1/827 |
| 10,591,164 B2* | 3/2020 | Patel | F23R 3/34 |
| 2008/0236165 A1 | 10/2008 | Baudoin et al. | |
| 2010/0050644 A1* | 3/2010 | Pidcock | F23R 3/343 |
| | | | 60/737 |
| 2014/0311151 A1* | 10/2014 | Saito | F23R 3/343 |
| | | | 60/737 |
| 2015/0159874 A1* | 6/2015 | Toon | F23D 11/107 |
| | | | 60/737 |
| 2016/0265780 A1* | 9/2016 | Patel | F23R 3/286 |
| 2016/0305327 A1* | 10/2016 | Patel | F23R 3/14 |
| 2017/0299183 A1* | 10/2017 | Bagchi | F23N 3/002 |
| 2019/0086088 A1* | 3/2019 | Stevens | F23R 3/50 |
| 2020/0025386 A1* | 1/2020 | Muldal | F23R 3/14 |
| 2020/0041128 A1* | 2/2020 | Benjamin | F23R 3/286 |
| 2020/0191394 A1* | 6/2020 | Tentorio | F23R 3/28 |
| 2020/0224877 A1* | 7/2020 | Gomez Del Campo | F02C 7/22 |

FOREIGN PATENT DOCUMENTS

| | | |
|---|---|---|
| EP | 1953455 A1 | 8/2008 |
| EP | 3537048 A1 | 9/2019 |
| GB | 2456147 A | 7/2009 |
| JP | 2010-281513 A | 12/2010 |
| WO | 2008/071902 A1 | 6/2008 |

OTHER PUBLICATIONS

Nov. 27, 2019 Search Report issued in British Patent Application No. 1909168.5.

\* cited by examiner

GAS TURBINE FUEL INJECTOR COMPRISING A SPLITTER HAVING A CAVITY

CROSS-REFERENCE TO RELATED APPLICATIONS

This specification is based upon and claims the benefit of priority from United Kingdom patent application number GB 1909168.5 filed on Jun. 26, 2019, the entire contents of which are incorporated herein by reference.

BACKGROUND

Field of the Disclosure

The present disclosure relates to a fuel injector, in particular a fuel injector for a gas turbine engine, and a gas turbine engine including such a fuel injector.

Background of the Disclosure

Fuel injectors are provided to deliver fuel into the combustion chamber provided in for example, a gas turbine engine. Such fuel injectors may comprise a number of air swirlers arranged in swirler passages to impart a swirl to the flow of an air-fuel mixture to provide improvements in combustion. The swirler passages may be separated by splitters, which may promote air flow patterns which allow recirculation zones where the flow from different passages mixes. Such splitters, which are exposed to hot combustion gases, may benefit from cooling.

It is an aim of the present disclosure to provide a fuel injector which provides improved cooling and air flow patterns.

SUMMARY OF THE DISCLOSURE

According to a first aspect there is provided a fuel injector comprising a first air swirler passage and a second air swirler passage extending axially through the fuel injector and arranged to direct air through the fuel injector; a splitter arranged between the first air swirler passage and the second air swirler passage and comprising: a first splitter surface having a first divergent portion which is divergent in the downstream direction; a second splitter surface located radially inward of the first splitter surface and having a second divergent portion which is divergent in the downstream direction; a third splitter surface located radially inward of the first and second splitter surfaces; and a first connecting surface extending between the second and third splitter surfaces; wherein a first cavity is formed between the first and second splitter surfaces, and the second divergent portion comprises at least one opening in fluid communication with the first cavity.

The second splitter surface may comprise a plurality of openings in fluid communication with the first cavity.

The openings may be distributed circumferentially around the second splitter surface.

The first divergent portion may be frustoconical.

The second divergent portion may be frustoconical.

The first divergent potion may extend substantially parallel to the second divergent portion.

The fuel injector may further comprise a second connecting surface extending between the first and second splitter surfaces.

The first connecting surface may extend substantially perpendicularly to the second divergent portion.

The third splitter surface may comprise a third divergent portion which is divergent in the downstream direction.

The second splitter surface may further comprise a dividing portion so as to define a second cavity between the second and third splitter surfaces and the first connecting surface.

The second cavity may be sealed from the first cavity.

The second splitter surface may be divided into a plurality of circumferential arcuate segments, with the at least one opening being provided at a join between two circumferential sections.

The radius of each of the arcuate segments may vary along its length.

In another aspect, there is provided a gas turbine engine for an aircraft comprising: an engine core comprising combustion equipment, a turbine, a compressor, and a core shaft connecting the turbine to the compressor; a fan located upstream of the engine core, the fan comprising a plurality of fan blades; and a gearbox that receives an input from the core shaft and outputs drive to the fan so as to drive the fan at a lower rotational speed than the core shaft, wherein the combustion equipment comprises at least one fuel injector as defined above.

In the above gas turbine engine, the turbine may be a first turbine, the compressor may be a first compressor, and the core shaft may be a first core shaft, the engine core further may further comprise a second turbine, a second compressor, and a second core shaft connecting the second turbine to the second compressor; and the second turbine, second compressor, and second core shaft may be arranged to rotate at a higher rotational speed than the first core shaft.

BRIEF DESCRIPTION OF THE DRAWINGS

Embodiments will now be described by way of example only, with reference to the Figures, in which.

DETAILED DESCRIPTION OF THE DISCLOSURE

Figure 1:
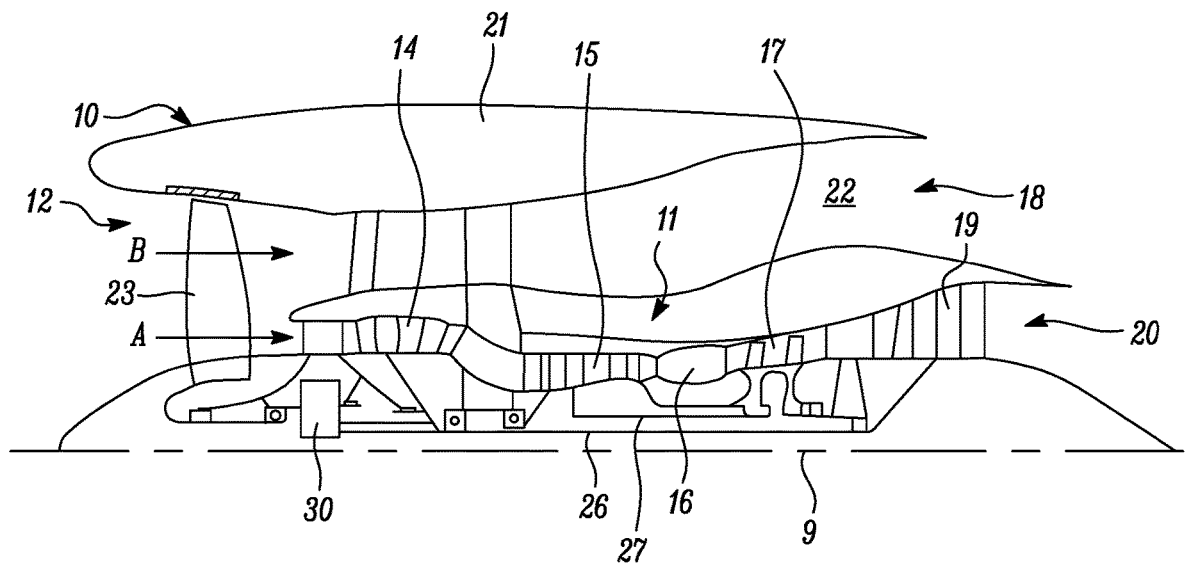
FIG. 1 is a sectional side view of a gas turbine engine.

As noted elsewhere herein, the present disclosure may relate to a gas turbine engine. Such a gas turbine engine may comprise an engine core comprising a turbine, a combustor, a compressor, and a core shaft connecting the turbine to the compressor. Such a gas turbine engine may comprise a fan (having fan blades) located upstream of the engine core.

Arrangements of the present disclosure may be particularly, although not exclusively, beneficial for fans that are driven via a gearbox. Accordingly, the gas turbine engine may comprise a gearbox that receives an input from the core shaft and outputs drive to the fan so as to drive the fan at a lower rotational speed than the core shaft. The input to the gearbox may be directly from the core shaft, or indirectly from the core shaft, for example via a spur shaft and/or gear. The core shaft may rigidly connect the turbine and the compressor, such that the turbine and compressor rotate at the same speed (with the fan rotating at a lower speed).

The gas turbine engine as described and/or claimed herein may have any suitable general architecture. For example, the gas turbine engine may have any desired number of shafts that connect turbines and compressors, for example one, two or three shafts. Purely by way of example, the turbine connected to the core shaft may be a first turbine, the compressor connected to the core shaft may be a first compressor, and the core shaft may be a first core shaft. The engine core may further comprise a second turbine, a second compressor, and a second core shaft connecting the second turbine to the second compressor. The second turbine, second compressor, and second core shaft may be arranged to rotate at a higher rotational speed than the first core shaft.

In such an arrangement, the second compressor may be positioned axially downstream of the first compressor. The second compressor may be arranged to receive (for example directly receive, for example via a generally annular duct) flow from the first compressor.

The gearbox may be arranged to be driven by the core shaft that is configured to rotate (for example in use) at the lowest rotational speed (for example the first core shaft in the example above). For example, the gearbox may be arranged to be driven only by the core shaft that is configured to rotate (for example in use) at the lowest rotational speed (for example only be the first core shaft, and not the second core shaft, in the example above). Alternatively, the gearbox may be arranged to be driven by any one or more shafts, for example the first and/or second shafts in the example above.

The gearbox may be a reduction gearbox (in that the output to the fan is a lower rotational rate than the input from the core shaft). Any type of gearbox may be used. For example, the gearbox may be a "planetary" or "star" gearbox, as described in more detail elsewhere herein. The gearbox may have any desired reduction ratio (defined as the rotational speed of the input shaft divided by the rotational speed of the output shaft), for example greater than 2.5, for example in the range of from 3 to 4.2, or 3.2 to 3.8, for example on the order of or at least 3, 3.1, 3.2, 3.3, 3.4, 3.5, 3.6, 3.7, 3.8, 3.9, 4, 4.1 or 4.2. The gear ratio may be, for example, between any two of the values in the previous sentence. Purely by way of example, the gearbox may be a "star" gearbox having a ratio in the range of from 3.1 or 3.2 to 3.8. In some arrangements, the gear ratio may be outside these ranges.

In any gas turbine engine as described and/or claimed herein, a combustor may be provided axially downstream of the fan and compressor(s). For example, the combustor may be directly downstream of (for example at the exit of) the second compressor, where a second compressor is provided. By way of further example, the flow at the exit to the combustor may be provided to the inlet of the second turbine, where a second turbine is provided. The combustor may be provided upstream of the turbine(s).

The or each compressor (for example the first compressor and second compressor as described above) may comprise any number of stages, for example multiple stages. Each stage may comprise a row of rotor blades and a row of stator vanes, which may be variable stator vanes (in that their angle of incidence may be variable). The row of rotor blades and the row of stator vanes may be axially offset from each other.

The or each turbine (for example the first turbine and second turbine as described above) may comprise any number of stages, for example multiple stages. Each stage may comprise a row of rotor blades and a row of stator vanes. The row of rotor blades and the row of stator vanes may be axially offset from each other.

Each fan blade may be defined as having a radial span extending from a root (or hub) at a radially inner gas-washed location, or 0% span position, to a tip at a 100% span position. The ratio of the radius of the fan blade at the hub to the radius of the fan blade at the tip may be less than (or on the order of) any of: 0.4, 0.39, 0.38 0.37, 0.36, 0.35, 0.34, 0.33, 0.32, 0.31, 0.3, 0.29, 0.28, 0.27, 0.26, or 0.25. The ratio of the radius of the fan blade at the hub to the radius of the fan blade at the tip may be in an inclusive range bounded by any two of the values in the previous sentence (i.e. the values may form upper or lower bounds), for example in the range of from 0.28 to 0.32. These ratios may commonly be referred to as the hub-to-tip ratio. The radius at the hub and the radius at the tip may both be measured at the leading edge (or axially forwardmost) part of the blade. The hub-to-tip ratio refers, of course, to the gas-washed portion of the fan blade, i.e. the portion radially outside any platform.

The radius of the fan may be measured between the engine centreline and the tip of a fan blade at its leading edge. The fan diameter (which may simply be twice the radius of the fan) may be greater than (or on the order of) any of: 220 cm, 230 cm, 240 cm, 250 cm (around 100 inches), 260 cm, 270 cm (around 105 inches), 280 cm (around 110 inches), 290 cm (around 115 inches), 300 cm (around 120 inches), 310 cm, 320 cm (around 125 inches), 330 cm (around 130 inches), 340 cm (around 135 inches), 350 cm, 360 cm (around 140 inches), 370 cm (around 145 inches), 380 (around 150 inches) cm, 390 cm (around 155 inches), 400 cm, 410 cm (around 160 inches) or 420 cm (around 165 inches). The fan diameter may be in an inclusive range bounded by any two of the values in the previous sentence (i.e. the values may form upper or lower bounds), for example in the range of from 240 cm to 280 cm or 330 cm to 380 cm.

The rotational speed of the fan may vary in use. Generally, the rotational speed is lower for fans with a higher diameter. Purely by way of non-limitative example, the rotational speed of the fan at cruise conditions may be less than 2500 rpm, for example less than 2300 rpm. Purely by way of further non-limitative example, the rotational speed of the fan at cruise conditions for an engine having a fan diameter in the range of from 220 cm to 300 cm (for example 240 cm to 280 cm or 250 cm to 270 cm) may be in the range of from 1700 rpm to 2500 rpm, for example in the range of from 1800 rpm to 2300 rpm, for example in the range of from 1900 rpm to 2100 rpm. Purely by way of further non-limitative example, the rotational speed of the fan at cruise conditions for an engine having a fan diameter in the range of from 330 cm to 380 cm may be in the range of from 1200 rpm to 2000 rpm, for example in the range of from 1300 rpm to 1800 rpm, for example in the range of from 1400 rpm to 1800 rpm.

In use of the gas turbine engine, the fan (with associated fan blades) rotates about a rotational axis. This rotation results in the tip of the fan blade moving with a velocity $U_{tip}$. The work done by the fan blades 13 on the flow results in an enthalpy rise dH of the flow. A fan tip loading may be defined as $dH/U_{tip}^2$, where dH is the enthalpy rise (for example the 1-D average enthalpy rise) across the fan and $U_{tip}$ is the (translational) velocity of the fan tip, for example at the leading edge of the tip (which may be defined as fan tip radius at leading edge multiplied by angular speed). The fan tip loading at cruise conditions may be greater than (or on the order of) any of: 0.28, 0.29, 0.30, 0.31, 0.32, 0.33, 0.34, 0.35, 0.36, 0.37, 0.38, 0.39 or 0.4 (all units in this paragraph being $Jkg^{-1}K^{-1}/(ms^{-1})^2$). The fan tip loading may be in an inclusive range bounded by any two of the values in the previous sentence (i.e. the values may form upper or lower bounds), for example in the range of from 0.28 to 0.31, or 0.29 to 0.3.

Gas turbine engines in accordance with the present disclosure may have any desired bypass ratio, where the bypass ratio is defined as the ratio of the mass flow rate of the flow through the bypass duct to the mass flow rate of the flow through the core at cruise conditions. In some arrangements the bypass ratio may be greater than (or on the order of) any of the following: 10, 10.5, 11, 11.5, 12, 12.5, 13, 13.5, 14, 14.5, 15, 15.5, 16, 16.5, 17, 17.5, 18, 18.5, 19, 19.5 or 20. The bypass ratio may be in an inclusive range bounded by any two of the values in the previous sentence (i.e. the values may form upper or lower bounds), for example in the range of form 12 to 16, 13 to 15, or 13 to 14. The bypass duct may be substantially annular. The bypass duct may be radially outside the engine core. The radially outer surface of the bypass duct may be defined by a nacelle and/or a fan case.

The overall pressure ratio of a gas turbine engine as described and/or claimed herein may be defined as the ratio of the stagnation pressure upstream of the fan to the stagnation pressure at the exit of the highest pressure compressor (before entry into the combustor). By way of non-limitative example, the overall pressure ratio of a gas turbine engine as described and/or claimed herein at cruise may be greater than (or on the order of) any of the following: 35, 40, 45, 50, 55, 60, 65, 70, 75. The overall pressure ratio may be in an inclusive range bounded by any two of the values in the previous sentence (i.e. the values may form upper or lower bounds), for example in the range of from 50 to 70.

Specific thrust of an engine may be defined as the net thrust of the engine divided by the total mass flow through the engine. At cruise conditions, the specific thrust of an engine described and/or claimed herein may be less than (or on the order of) any of the following: 110 $Nkg^{-1}s$, 105 $Nkg^{-1}s$, 100 $Nkg^{-1}s$, 95 $Nkg^{-1}s$, 90 $Nkg^{-1}s$, 85 $Nkg^{-1}s$ or 80 $Nkg^{-1}s$. The specific thrust may be in an inclusive range bounded by any two of the values in the previous sentence (i.e. the values may form upper or lower bounds), for example in the range of from 80 $Nkg^{-1}s$ to 100 $Nkg^{-1}s$, or 85 $Nkg^{-1}s$ to 95 $Nkg^{-1}s$. Such engines may be particularly efficient in comparison with conventional gas turbine engines.

A gas turbine engine as described and/or claimed herein may have any desired maximum thrust. Purely by way of non-limitative example, a gas turbine as described and/or claimed herein may be capable of producing a maximum thrust of at least (or on the order of) any of the following: 160 kN, 170 kN, 180 kN, 190 kN, 200 kN, 250 kN, 300 kN, 350 kN, 400 kN, 450 kN, 500 kN, or 550 kN. The maximum thrust may be in an inclusive range bounded by any two of the values in the previous sentence (i.e. the values may form upper or lower bounds). Purely by way of example, a gas turbine as described and/or claimed herein may be capable of producing a maximum thrust in the range of from 330 kN to 420 kN, for example 350 kN to 400 kN. The thrust referred to above may be the maximum net thrust at standard atmospheric conditions at sea level plus 15 degrees C. (ambient pressure 101.3 kPa, temperature 30 degrees C.), with the engine static.

In use, the temperature of the flow at the entry to the high pressure turbine may be particularly high. This temperature, which may be referred to as TET, may be measured at the exit to the combustor, for example immediately upstream of the first turbine vane, which itself may be referred to as a nozzle guide vane. At cruise, the TET may be at least (or on the order of) any of the following: 1400 K, 1450 K, 1500 K, 1550 K, 1600 K or 1650 K. The TET at cruise may be in an inclusive range bounded by any two of the values in the previous sentence (i.e. the values may form upper or lower bounds). The maximum TET in use of the engine may be, for example, at least (or on the order of) any of the following: 1700 K, 1750 K, 1800 K, 1850 K, 1900 K, 1950 K or 2000 K. The maximum TET may be in an inclusive range bounded by any two of the values in the previous sentence (i.e. the values may form upper or lower bounds), for example in the range of from 1800 K to 1950 K. The maximum TET may occur, for example, at a high thrust condition, for example at a maximum take-off (MTO) condition.

A fan blade and/or aerofoil portion of a fan blade described and/or claimed herein may be manufactured from any suitable material or combination of materials. For example at least a part of the fan blade and/or aerofoil may be manufactured at least in part from a composite, for example a metal matrix composite and/or an organic matrix composite, such as carbon fibre. By way of further example at least a part of the fan blade and/or aerofoil may be manufactured at least in part from a metal, such as a titanium based metal or an aluminium based material (such as an aluminium-lithium alloy) or a steel based material. The fan blade may comprise at least two regions manufactured using different materials. For example, the fan blade may have a protective leading edge, which may be manufactured using a material that is better able to resist impact (for example from birds, ice or other material) than the rest of the blade. Such a leading edge may, for example, be manufactured using titanium or a titanium-based alloy. Thus, purely by way of example, the fan blade may have a carbon-fibre or aluminium based body (such as an aluminium lithium alloy) with a titanium leading edge.

A fan as described and/or claimed herein may comprise a central portion, from which the fan blades may extend, for example in a radial direction. The fan blades may be attached to the central portion in any desired manner. For example, each fan blade may comprise a fixture which may engage a corresponding slot in the hub (or disc). Purely by way of example, such a fixture may be in the form of a dovetail that may slot into and/or engage a corresponding slot in the hub/disc in order to fix the fan blade to the hub/disc. By way of further example, the fan blades maybe formed integrally with a central portion. Such an arrangement may be referred to as a bladed disc or a bladed ring. Any suitable method may be used to manufacture such a bladed disc or bladed ring. For example, at least a part of the fan blades may be machined from a block and/or at least part of the fan blades may be attached to the hub/disc by welding, such as linear friction welding.

The gas turbine engines described and/or claimed herein may or may not be provided with a variable area nozzle (VAN). Such a variable area nozzle may allow the exit area of the bypass duct to be varied in use. The general principles of the present disclosure may apply to engines with or without a VAN.

The fan of a gas turbine as described and/or claimed herein may have any desired number of fan blades, for example 14, 16, 18, 20, 22, 24 or 26 fan blades.

As used herein, cruise conditions may mean cruise conditions of an aircraft to which the gas turbine engine is attached. Such cruise conditions may be conventionally defined as the conditions at mid-cruise, for example the conditions experienced by the aircraft and/or engine at the midpoint (in terms of time and/or distance) between top of climb and start of decent.

Purely by way of example, the forward speed at the cruise condition may be any point in the range of from Mach 0.7 to 0.9, for example 0.75 to 0.85, for example 0.76 to 0.84, for example 0.77 to 0.83, for example 0.78 to 0.82, for example 0.79 to 0.81, for example on the order of Mach 0.8, on the order of Mach 0.85 or in the range of from 0.8 to 0.85. Any single speed within these ranges may be the cruise condition. For some aircraft, the cruise conditions may be outside these ranges, for example below Mach 0.7 or above Mach 0.9.

Purely by way of example, the cruise conditions may correspond to standard atmospheric conditions at an altitude that is in the range of from 10000 m to 15000 m, for example in the range of from 10000 m to 12000 m, for example in the range of from 10400 m to 11600 m (around 38000 ft), for example in the range of from 10500 m to 11500 m, for example in the range of from 10600 m to 11400 m, for example in the range of from 10700 m (around 35000 ft) to 11300 m, for example in the range of from 10800 m to 11200 m, for example in the range of from 10900 m to 11100 m, for example on the order of 11000 m. The cruise conditions may correspond to standard atmospheric conditions at any given altitude in these ranges.

Purely by way of example, the cruise conditions may correspond to: a forward Mach number of 0.8; a pressure of 23000 Pa; and a temperature of −55 degrees C. Purely by way of further example, the cruise conditions may correspond to: a forward Mach number of 0.85; a pressure of 24000 Pa; and a temperature of −54 degrees C. (which may be standard atmospheric conditions at 35000 ft).

As used anywhere herein, "cruise" or "cruise conditions" may mean the aerodynamic design point. Such an aerodynamic design point (or ADP) may correspond to the conditions (comprising, for example, one or more of the Mach Number, environmental conditions and thrust requirement) for which the fan is designed to operate. This may mean, for example, the conditions at which the fan (or gas turbine engine) is designed to have optimum efficiency.

In use, a gas turbine engine described and/or claimed herein may operate at the cruise conditions defined elsewhere herein. Such cruise conditions may be determined by the cruise conditions (for example the mid-cruise conditions) of an aircraft to which at least one (for example 2 or 4) gas turbine engine may be mounted in order to provide propulsive thrust.

The skilled person will appreciate that except where mutually exclusive, a feature or parameter described in relation to any one of the above aspects may be applied to any other aspect. Furthermore, except where mutually exclusive, any feature or parameter described herein may be applied to any aspect and/or combined with any other feature or parameter described herein.

FIG. 1 illustrates a gas turbine engine 10 having a principal rotational axis 9. The engine 10 comprises an air intake 12 and a propulsive fan 23 that generates two airflows: a core airflow A and a bypass airflow B. The gas turbine engine 10 comprises a core 11 that receives the core airflow A. The engine core 11 comprises, in axial flow series, a low pressure compressor 14, a high-pressure compressor 15, combustion equipment 16, a high-pressure turbine 17, a low pressure turbine 19 and a core exhaust nozzle 20. A nacelle 21 surrounds the gas turbine engine 10 and defines a bypass duct 22 and a bypass exhaust nozzle 18. The bypass airflow B flows through the bypass duct 22. The fan 23 is attached to and driven by the low pressure turbine 19 via a shaft 26 and an epicyclic gearbox 30.

In use, the core airflow A is accelerated and compressed by the low pressure compressor 14 and directed into the high pressure compressor 15 where further compression takes place. The compressed air exhausted from the high pressure compressor 15 is directed into the combustion equipment 16 where it is mixed with fuel and the mixture is combusted. The resultant hot combustion products then expand through, and thereby drive, the high pressure and low pressure turbines 17, 19 before being exhausted through the core exhaust nozzle 20 to provide some propulsive thrust. The high pressure turbine 17 drives the high pressure compressor 15 by a suitable interconnecting shaft 27. The fan 23 generally provides the majority of the propulsive thrust. The epicyclic gearbox 30 is a reduction gearbox.

Figure 2:
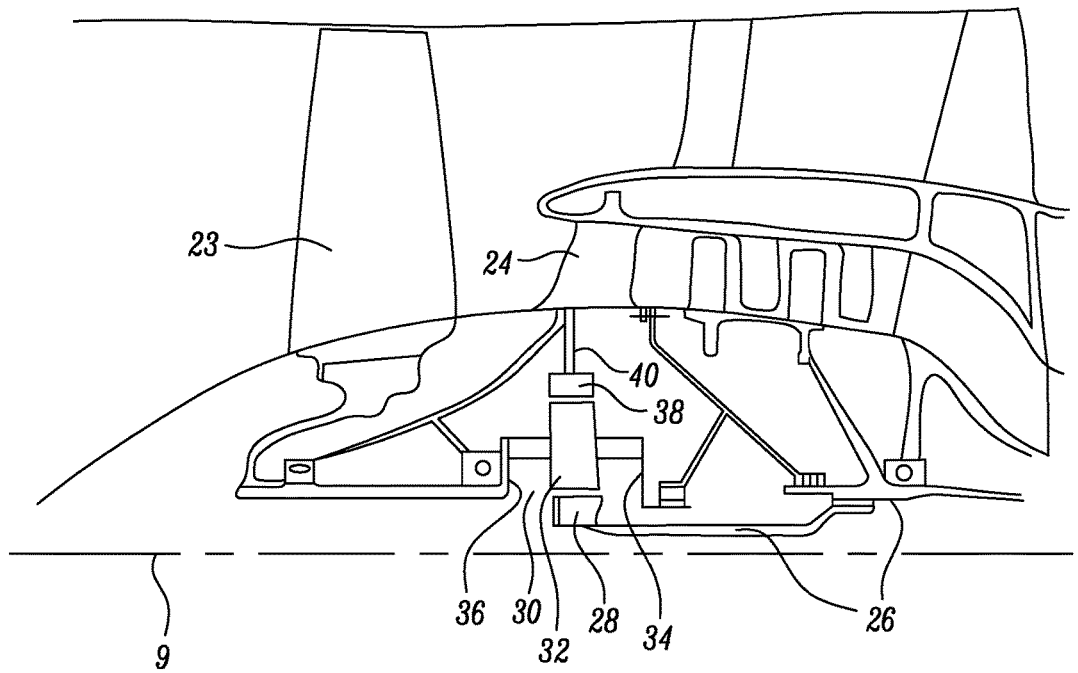
FIG. 2 is a close up sectional side view of an upstream portion of a gas turbine engine.

An exemplary arrangement for a geared fan gas turbine engine 10 is shown in FIG. 2. The low pressure turbine 19 (see FIG. 1) drives the shaft 26, which is coupled to a sun wheel, or sun gear, 28 of the epicyclic gear arrangement 30. Radially outwardly of the sun gear 28 and intermeshing therewith is a plurality of planet gears 32 that are coupled together by a planet carrier 34. The planet carrier 34 constrains the planet gears 32 to precess around the sun gear 28 in synchronicity whilst enabling each planet gear 32 to rotate about its own axis. The planet carrier 34 is coupled via linkages 36 to the fan 23 in order to drive its rotation about the engine axis 9. Radially outwardly of the planet gears 32 and intermeshing therewith is an annulus or ring gear 38 that is coupled, via linkages 40, to a stationary supporting structure 24.

Note that the terms "low pressure turbine" and "low pressure compressor" as used herein may be taken to mean the lowest pressure turbine stages and lowest pressure compressor stages (i.e. not including the fan 23) respectively and/or the turbine and compressor stages that are connected together by the interconnecting shaft 26 with the lowest rotational speed in the engine (i.e. not including the gearbox output shaft that drives the fan 23). In some literature, the "low pressure turbine" and "low pressure compressor" referred to herein may alternatively be known as the "intermediate pressure turbine" and "intermediate pressure compressor". Where such alternative nomenclature is used, the fan 23 may be referred to as a first, or lowest pressure, compression stage.

Figure 3:
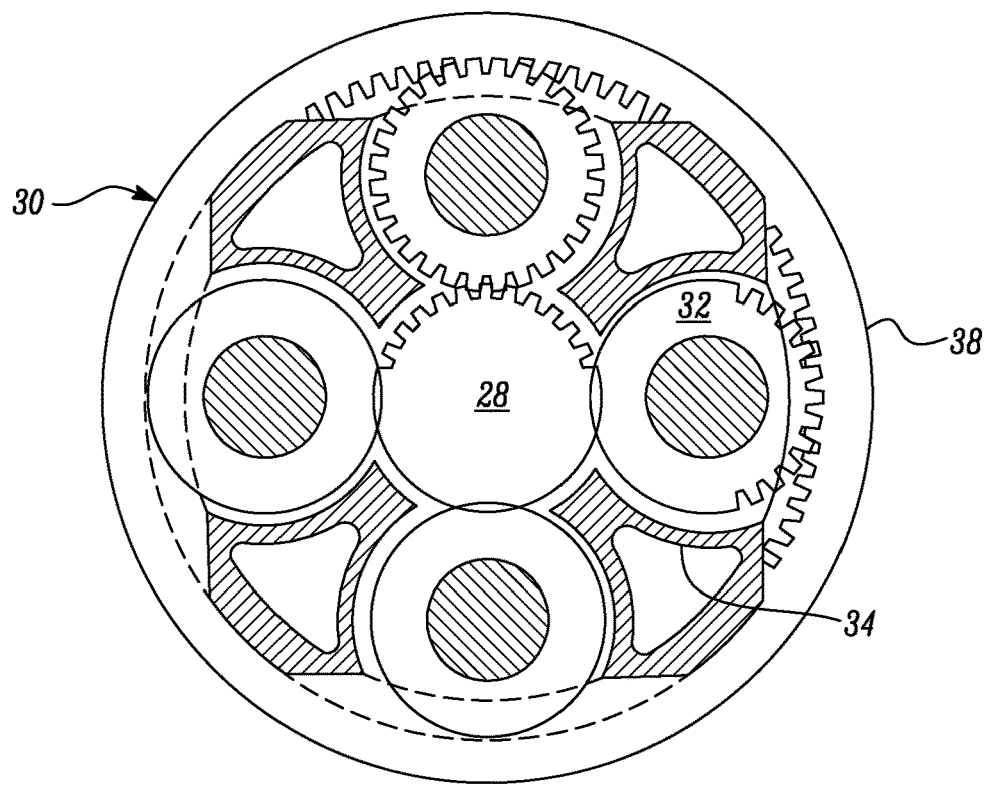
FIG. 3 is a partially cut-away view of a gearbox for a gas turbine engine.

The epicyclic gearbox 30 is shown by way of example in greater detail in FIG. 3. Each of the sun gear 28, planet gears 32 and ring gear 38 comprise teeth about their periphery to intermesh with the other gears. However, for clarity only exemplary portions of the teeth are illustrated in FIG. 3. There are four planet gears 32 illustrated, although it will be apparent to the skilled reader that more or fewer planet gears 32 may be provided within the scope of the claimed invention. Practical applications of a planetary epicyclic gearbox 30 generally comprise at least three planet gears 32.

The epicyclic gearbox 30 illustrated by way of example in FIGS. 2 and 3 is of the planetary type, in that the planet carrier 34 is coupled to an output shaft via linkages 36, with the ring gear 38 fixed. However, any other suitable type of epicyclic gearbox 30 may be used. By way of further example, the epicyclic gearbox 30 may be a star arrangement, in which the planet carrier 34 is held fixed, with the ring (or annulus) gear 38 allowed to rotate. In such an arrangement the fan 23 is driven by the ring gear 38. By way of further alternative example, the gearbox 30 may be a differential gearbox in which the ring gear 38 and the planet carrier 34 are both allowed to rotate.

It will be appreciated that the arrangement shown in FIGS. 2 and 3 is by way of example only, and various alternatives are within the scope of the present disclosure. Purely by way of example, any suitable arrangement may be used for locating the gearbox 30 in the engine 10 and/or for connecting the gearbox 30 to the engine 10. By way of further example, the connections (such as the linkages 36, 40 in the FIG. 2 example) between the gearbox 30 and other parts of the engine 10 (such as the input shaft 26, the output shaft and the fixed structure 24) may have any desired degree of stiffness or flexibility. By way of further example, any suitable arrangement of the bearings between rotating and stationary parts of the engine (for example between the input and output shafts from the gearbox and the fixed structures, such as the gearbox casing) may be used, and the disclosure is not limited to the exemplary arrangement of FIG. 2. For example, where the gearbox 30 has a star arrangement (described above), the skilled person would readily understand that the arrangement of output and support linkages and bearing locations would typically be different to that shown by way of example in FIG. 2.

Accordingly, the present disclosure extends to a gas turbine engine having any arrangement of gearbox styles (for example star or planetary), support structures, input and output shaft arrangement, and bearing locations.

Optionally, the gearbox may drive additional and/or alternative components (e.g. the intermediate pressure compressor and/or a booster compressor).

Other gas turbine engines to which the present disclosure may be applied may have alternative configurations. For example, such engines may have an alternative number of compressors and/or turbines and/or an alternative number of interconnecting shafts. By way of further example, the gas turbine engine shown in FIG. 1 has a split flow nozzle 18, 20 meaning that the flow through the bypass duct 22 has its own nozzle 18 that is separate to and radially outside the core exhaust nozzle 20. However, this is not limiting, and any aspect of the present disclosure may also apply to engines in which the flow through the bypass duct 22 and the flow through the core 11 are mixed, or combined, before (or upstream of) a single nozzle, which may be referred to as a mixed flow nozzle. One or both nozzles (whether mixed or split flow) may have a fixed or variable area. Whilst the described example relates to a turbofan engine, the disclosure may apply, for example, to any type of gas turbine engine, such as an open rotor (in which the fan stage is not surrounded by a nacelle) or turboprop engine, for example. In some arrangements, the gas turbine engine 10 may not comprise a gearbox 30.

The geometry of the gas turbine engine 10, and components thereof, is defined by a conventional axis system, comprising an axial direction (which is aligned with the rotational axis 9), a radial direction (in the bottom-to-top direction in FIG. 1), and a circumferential direction (perpendicular to the page in the FIG. 1 view). The axial, radial and circumferential directions are mutually perpendicular.

Figure 4:
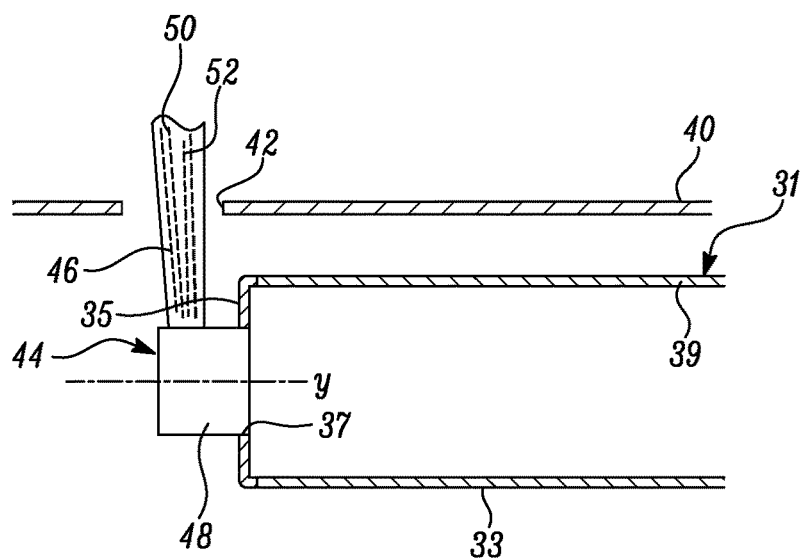
FIG. 4 is an enlarged cross-sectional view of combustion equipment of the gas turbine engine.

The combustion equipment 16 is shown more clearly in FIG. 4. The combustion equipment 16 comprises an annular combustion chamber defined by an inner annular wall 33, an outer annular wall 31 and an upstream wall 35. The upstream end wall 35 has a plurality of circumferentially spaced apertures, for example equi-circumferentially spaced apertures, 37. The combustion chamber is surrounded by a combustion chamber casing 40 and the combustion chamber casing 40 has a plurality of circumferentially spaced apertures 42. The combustion equipment 16 also comprises a plurality of fuel injectors 44 and each fuel injector 44 extends radially through a corresponding one of the apertures 42 in the combustion chamber casing 40 and locates in a corresponding one of the apertures 37 in the upstream end wall 35 of the combustion chamber to supply fuel into the combustion chamber.

Figure 5:
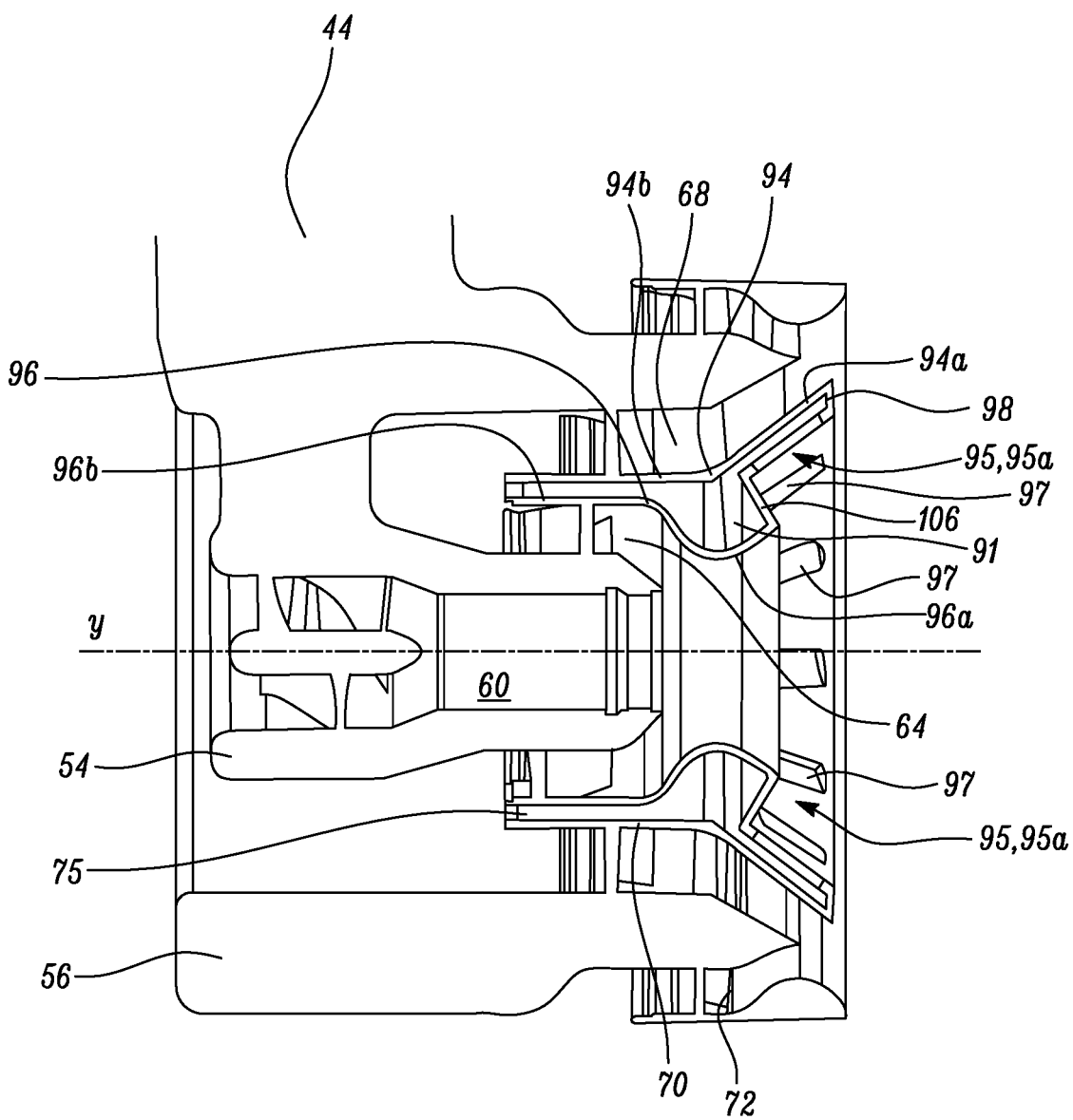
FIG. 5 is a cross-sectional view of a first arrangement of the fuel injector of the combustion equipment.

A cross-sectional view of a fuel injector 44 according to the present disclosure is shown in FIG. 5. The fuel injector has an axis Y, which may be substantially parallel to the axis X of the engine, or may be at an angle to the axis X of the engine, which may be referred to as a cant angle. The cant angle may typically be between 0 and 20 degrees, and is preferably between 0 and 10 degrees. The axis Y of each fuel injector 48 is generally aligned with the axis of the corresponding aperture 37 in the upstream end wall 35 of the combustion chamber.

The fuel injector 44 has a coaxial arrangement of an inner pilot air-blast fuel injector 54 and an outer main air-blast fuel injector 56. The inner pilot air-blast fuel injector 54 comprises, in order radially outwardly, a coaxial arrangement of a pilot inner air swirler passage 60 and a pilot outer air swirler passage 64. The outer main air-blast fuel injector 56 comprises, in order radially outwardly, a coaxial arrangement of a main inner air swirler passage 68 and a main outer air swirler passage 72. An intermediate air passage 75 may be sandwiched between the pilot outer air swirler passage 64 of the inner pilot air-blast fuel injector 54 and the main inner air swirler passage 68 of the outer main air-blast fuel injector 56. The intermediate air passage 75 may comprise one or more vanes configured to impart a swirl to the airflow, in which case it may be considered to be an intermediate air swirler passage.

As shown in FIG. 5, between the pilot outer air swirler passage 64 and the main inner air swirler passage 68 there is provided a splitter 70. The splitter 70 is arranged to separate the air-fuel mixture passing through the inner pilot air-blast fuel injector 54 from the air-fuel mixture passing through the outer main air-blast fuel injector 56. The splitter 70 also promotes the formation of an S-shaped recirculation zone, which provides recirculation of flow between the pilot flow and the main flow. The intermediate air passage 75, as referred to above, may also pass through the splitter 70.

The splitter 70 comprises a first splitter surface 94 having a first divergent portion 94a which is divergent in the downstream direction, a second splitter surface 95 located radially inward of the first splitter surface and having a second divergent portion 95a which is divergent in the downstream direction, a third splitter surface 96 located radially inward of the first and second splitter surfaces, and a first connecting surface 106 between the second and third splitter surfaces. A first cavity 91, which may be called the potted pilot cavity, is formed between the first and second splitter surfaces. The second splitter surface comprises at least one opening 97 in fluid communication with the first cavity 91.

The first splitter surface 94 has a first divergent portion 94a which is divergent in the downstream direction. In other words, when viewed in cross-section (as in FIG. 5), the circumference of the first divergent portion 94a increases towards the downstream direction (i.e. is flared outwards). The first divergent portion 94a (or surface) may have a generally frustoconical shape. The first splitter surface 94 may also comprise a first extension portion 94b which extends substantially parallel to the axis Y.

The second splitter surface 95, which is located radially inward of the first splitter surface 94, has a second divergent portion 95a which is divergent in the downstream direction. In other words, when viewed in cross-section (as in FIG. 5), the circumference of the second divergent portion 95a increases towards the downstream direction. The second divergent portion (or surface) may have a generally frustoconical shape.

The first and second splitter surfaces (and in particular the first and second divergent portions) can be considered to form a single splitter element with a double skin. In other words, the first splitter surface can be considered to be the outer skin of the double skin, and the second splitter surface can be considered to be the inner skin of the double skin.

As shown in FIG. 5, the first and second divergent portions 94a, 95a (and thus the first and second splitter surfaces 94, 95) may be joined by a second connecting portion 98. The first and second divergent portions may also extend substantially parallel to each other, as shown in FIG. 5. In other words, the first and second divergent potions may be arranged at the same angle relative to the axis Y. However, it will also be understood that the first and second divergent portions need not be parallel and need not be joined by a second connecting portion. For example, they could be disposed at an angle to each other and meet at a point.

The third splitter surface 96 is located radially inward of the first and second splitter surfaces. As shown in FIG. 5, it may have a have a third divergent portion 96a which is divergent in the downstream direction. In other words, when viewed in cross-section (as in FIG. 5), the circumference of the third divergent portion may increase towards the downstream direction. The third divergent portion (or surface) may have a generally frustoconical shape. The first splitter surface 94 may also comprise a second extension portion 96b which extends substantially parallel to the axis Y.

The first splitter surface 94 and the second splitter surface 95, and where present, the first second connecting portion 98, form (or define) a first cavity 91 between them. In the arrangement shown in FIG. 5, it can be seen that the first cavity 91 extends into the area inside the "double skin" described above. The first cavity 91 forms part of the intermediate air passage 75. In the arrangement shown in FIG. 5, the area between the first splitter surface 94 and the third splitter surface 96 (including the area between the first extension portion 94b and the second extension portion 94b) also forms part of the first cavity 91, and are thus part of the intermediate air passage.

The first connecting surface 106 is disposed such that it extends between the second and third splitter surfaces 95, 96. As shown in FIG. 5, it may take the form of a frustoconical surface which converges in the downstream direction. However, any suitable shape for joining the second and third splitter surfaces 95, 96 may be used. When viewed in cross-section (as in FIG. 5), the first connecting surface may extend in a direction which is perpendicular to the second splitter surface 95 and/or perpendicular to the third splitter surface 96.

The second splitter surface 95 comprises at least one opening 97 in fluid communication with the first cavity 91. That is, at least one hole is provided in the second splitter surface 95 such that fluid (such as cooling air) can flow between the inside of the first cavity 91 and the outside of the first cavity (i.e. near the outer surface of the second splitter surface 95). In particular, air may be removed from the compressor to be used as cooling air for the nozzle (and, in some arrangements, for other components in the combustion equipment), and directed to the nozzle by means of a conduit or any other suitable arrangement to deliver a stream of cooling air to the nozzle. In the arrangement shown in FIG. 5, a plurality of openings 97 are present, distributed evenly around the circumference of the second splitter surface 95. This may allow a stream of cooling air (from, for example, the compressor as described above) to be supplied to the intermediate air passage 75, which then exits through the openings to cool the splitter surfaces.

Figure 6:
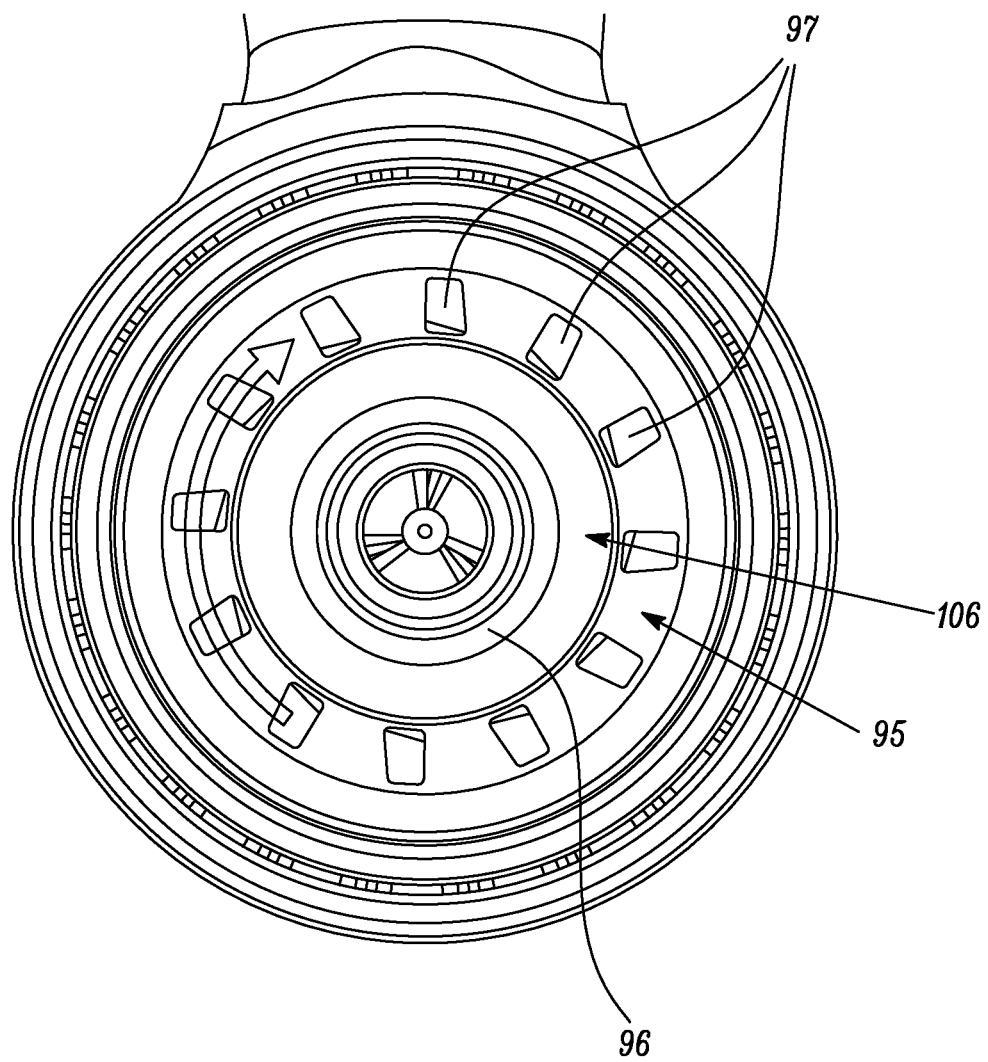
FIG. 6 is a front view of a first arrangement of the fuel injector of the combustion equipment.

The openings 97 shown in FIG. 5 are rectangular slots in the face of the second splitter surface 95, as best illustrated in FIG. 6. However, it will be understood that any suitable number, arrangement or shape of openings 97 can be used. The number, arrangement and shape of openings may be chosen as a function of the desired airflow pattern or as a function of the desired mass flow rate of air.

Figure 7:
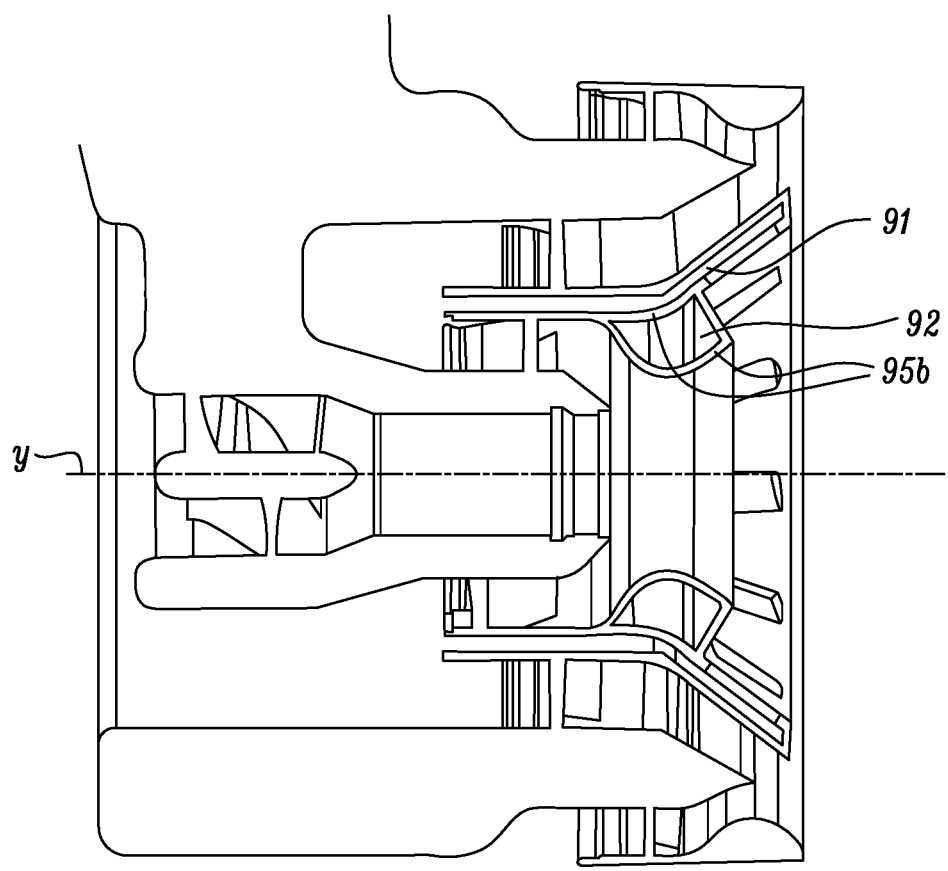
FIG. 7 is a cross-sectional view of a second arrangement of the fuel injector of the combustion equipment.

FIG. 7 shows a second arrangement of the fuel injector 44 of the present disclosure. The fuel injector 44 shown in FIG. 7 is substantially similar to that shown in FIG. 5, and the second splitter surface 95 further comprises a dividing portion 95b which extends between the second divergent portion 95a and the second extension portion 96b so as to provide a second cavity between the second and third splitter surfaces and the first connecting surface. In particular, the second cavity 92 is defined between the dividing portion 95b, the third splitter surface 96 and the first connecting surface 106. It will be understood that the second divergent portion 95a, the dividing portion 95b and the second extension portion 96b may be integrally formed, or may be separately formed and joined together.

The second cavity 92 may be sealed from the first cavity 91 by the dividing portion 95b. This may allow improved airflow through the intermediate air passage 75 (i.e. through the first cavity 91) and through the openings 97 without substantially affecting the cooling of the surfaces of the injector which are exposed to hot combustion gases. It will be appreciated that the rest of the fuel injector may be substantially the same as described above and as shown in FIG. 7. It will also be appreciated that a front view of FIG. 7 may be substantially the same as FIG. 6, which is a front view of FIG. 5.

Figure 8:
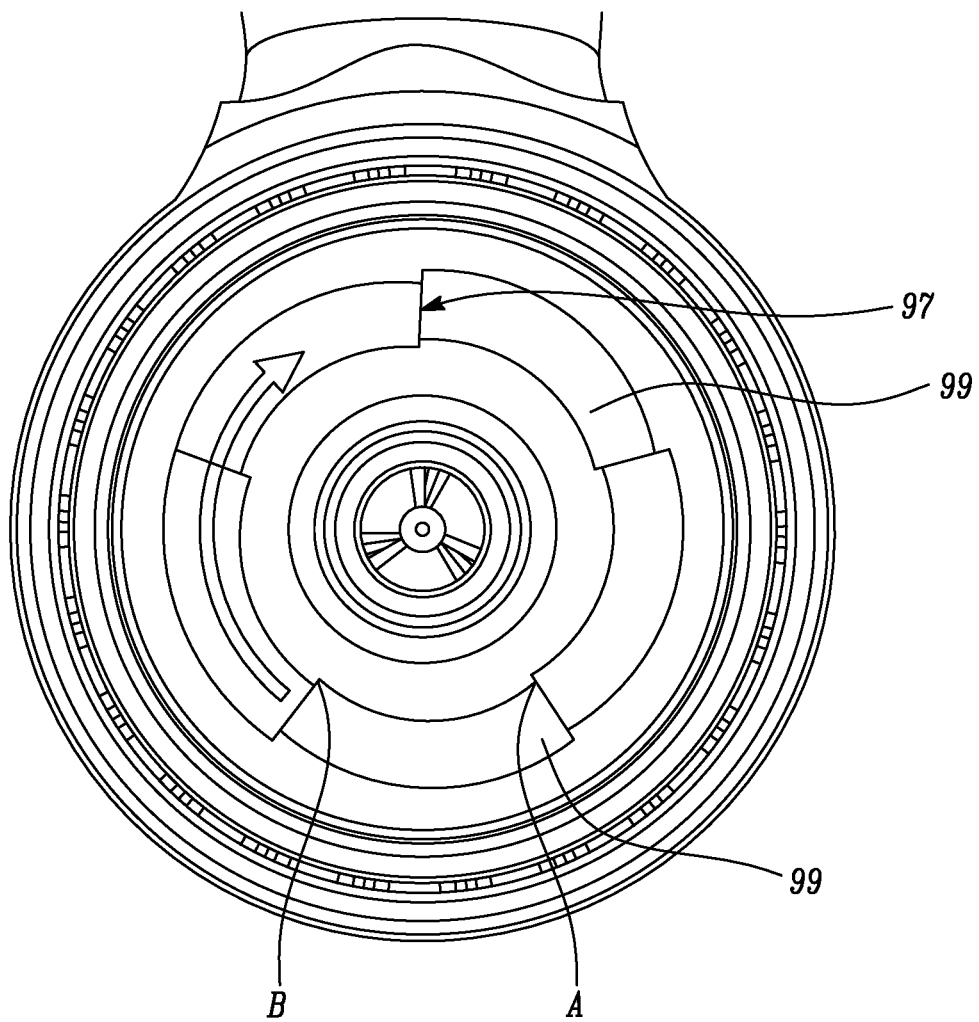
FIG. 8 is a front view of a third arrangement of the fuel injector of the combustion equipment.
Figure 9:
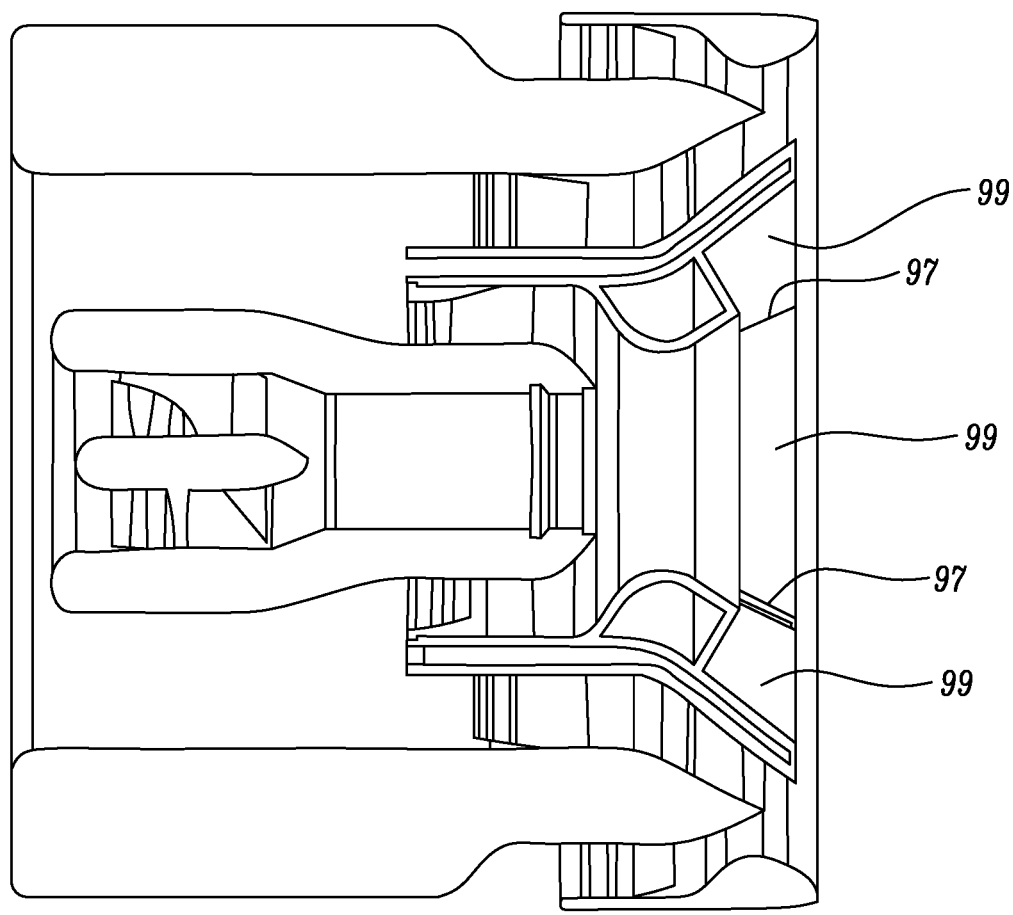
FIG. 9 is a cross-sectional view of a third arrangement of the fuel injector of the combustion equipment.

FIGS. 8 and 9 show a third arrangement of the fuel injector 44 of the present disclosure, in which the second splitter surface 95 is divided into a plurality of circumferential arcuate segments 99. An axial step may be provided between circumferential arcuate segments at the join where each of the arcuate segments meets each other. The at least one opening 97 is provided at the joins between the circumferential sections, and in particular in the step between the arcuate segments 99. In this arrangement, the openings are not provided in the face of the second splitter surface 95, but rather are in a plane which is parallel to the axial direction. It will be understood that, in this arrangement, the second splitter surface 95 is discontinuous due to the steps between the arcuate segments. However, this component can still be considered to be a "surface".

Further, as shown in FIG. 8, the radius of each of the arcuate segments may vary along the arc length of the segments 99. In particular, in the arrangement shown, the radius of the actuate segments 99 reduces clockwise around the segments in the view of FIG. 8. That is, the distance from the centre of the injector at the point marked B in FIG. 8 is smaller than the distance from centre of the injector to the point marked A.

The arrangement shown in FIGS. 8 and 9 may allow for a swirling flow around the circumference of the second splitter surface 95 which is re-energised when it passes each opening 97. This may in turn mean that the flow is less likely to separate from the second splitter surface 95, and in turn provide more effective cooling.

The fuel injector 44 described above and shown in FIG. 5 comprises four air swirler passages 60, 64, 68, 72 and an intermediate air passage 75, which may be a fifth swirler passage as explained above. However, the invention is applicable to any fuel injector (which may also be called a fuel spray nozzle) using multiple swirlers nested into each other. For example, there may be only two air swirler passages.

The fuel injector 44 may be a lean burn fuel injector. However, the arrangements of the present disclosure are also applicable to other types of fuel injector such as a rich burn fuel injector.

The fuel injector of the present application has been described above in the context of a fuel injector 44 for a gas turbine engine 10. Such a gas turbine engine 10 can be for an aircraft. However, the invention is not limited to gas turbine engines for aircraft. For example, the fuel injector 44 could be used in a stationary gas turbine, such as a gas turbine used in electric power generation. As a further example, the fuel injector 44 could be used as part of an industrial combustor such as a furnace. Such an industrial combustor is not necessarily a gas turbine type.

It will be understood that the invention is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

We claim:

1. A fuel injector comprising:
   a first air swirler passage and a second air swirler passage extending axially through the fuel injector and arranged to direct air through the fuel injector;
   a splitter arranged between the first air swirler passage and the second air swirler passage and comprising:
   a first splitter surface having a first divergent portion which is divergent in a downstream direction;
   a second splitter surface located radially inward of the first splitter surface and having a second divergent portion which is divergent in the downstream direction;
   a third splitter surface located radially inward of the first and second splitter surfaces; and
   a first connecting surface extending between the second and third splitter surfaces; wherein
   a first cavity is formed between the first and second splitter surfaces, and the second divergent portion comprises at least one opening in fluid communication with the first cavity, and
   the second splitter surface further comprises a dividing portion so as to define a second cavity between the second and third splitter surfaces and the first connecting surface.

2. The fuel injector according to claim 1, wherein the second splitter surface comprises a plurality of openings in fluid communication with the first cavity.

3. The fuel injector according to claim 2, wherein the openings are distributed circumferentially around the second splitter surface.

4. The fuel injector according to any one of the preceding claim 1, wherein the first divergent portion is frustoconical.

5. The fuel injector according to claim 1, wherein the second divergent portion is frustoconical.

6. The fuel injector according to claim 1, wherein the first divergent portion extends substantially parallel to the second divergent portion.

7. The fuel injector according to claim 1, further comprising a second connecting surface extending between the first and second splitter surfaces.

8. The fuel injector according to claim 1, wherein the first connecting surface extends substantially perpendicularly to the second divergent portion.

9. The fuel injector according to claim 1, wherein the third splitter surface comprises a third divergent portion which is divergent in the downstream direction.

10. The fuel injector according to claim 1, wherein the second cavity is sealed from the first cavity.

11. The fuel injector according to claim 1, wherein the second splitter surface is divided into a plurality of circumferential arcuate segments, with the at least one opening being provided at a join between two circumferential sections.

12. The fuel injector according to claim 11, wherein the radius of each of the arcuate segments varies along a length of each of the arcuate segments.

13. A gas turbine engine for an aircraft comprising:
   an engine core comprising combustion equipment, a turbine, a compressor, and a core shaft connecting the turbine to the compressor;
   a fan located upstream of the engine core, the fan comprising a plurality of fan blades; and
   a gearbox that receives an input from the core shaft and outputs drive to the fan so as to drive the fan at a lower rotational speed than the core shaft,
   wherein the combustion equipment comprises at least one fuel injector according to claim 1.

14. The gas turbine engine according to claim 13, wherein:
   the turbine is a first turbine, the compressor is a first compressor, and the core shaft is a first core shaft;
   the engine core further comprises a second turbine, a second compressor, and a second core shaft connecting the second turbine to the second compressor; and
   the second turbine, second compressor, and second core shaft are arranged to rotate at a higher rotational speed than the first core shaft.

15. A fuel injector comprising:
   a first air swirler passage and a second air swirler passage extending axially through the fuel injector and arranged to direct air through the fuel injector;
   a splitter arranged between the first air swirler passage and the second air swirler passage and comprising:
   a first splitter surface having a first divergent portion which is divergent in a downstream direction;
   a second splitter surface located radially inward of the first splitter surface and having a second divergent portion which is divergent in the downstream direction;
   a third splitter surface located radially inward of the first and second splitter surfaces; and
   a first connecting surface extending between the second and third splitter surfaces; wherein
   a first cavity is formed between the first and second splitter surfaces, and the second divergent portion comprises at least one opening in fluid communication with the first cavity, and the second splitter surface is divided into a plurality of circumferential arcuate segments, with the at least one opening being provided at a join between two circumferential sections.

16. The fuel injector according to claim 15, wherein the radius of each of the arcuate segments varies along a length of each of the arcuate segments.

* * * * *